(12) United States Patent
Geisler et al.

(10) Patent No.: US 10,883,474 B2
(45) Date of Patent: Jan. 5, 2021

(54) CONTROL SYSTEM AND METHOD FOR OPERATING A PLURALITY OF WIND TURBINES

(71) Applicant: SENVION GmbH, Hamburg (DE)

(72) Inventors: Jens Geisler, Rendsburg (DE); Jesse Ben Benjamin Schmuck, Flensburg (DE)

(73) Assignee: Senvion GmbH, Hamburg (DE)

( * ) Notice: Subject to any disclaimer, the term of this patent is extended or adjusted under 35 U.S.C. 154(b) by 162 days.

(21) Appl. No.: 16/167,646

(22) Filed: Oct. 23, 2018

(65) Prior Publication Data

US 2019/0120208 A1  Apr. 25, 2019

(30) Foreign Application Priority Data

Oct. 23, 2017  (DE) .................. 10 2017 009 837

(51) Int. Cl.
*F03D 7/04* (2006.01)
*F03D 1/00* (2006.01)
*G05B 13/04* (2006.01)

(52) U.S. Cl.
CPC .............. *F03D 7/045* (2013.01); *F03D 1/00* (2013.01); *F03D 7/048* (2013.01); *G05B 13/048* (2013.01);
(Continued)

(58) Field of Classification Search
CPC .......... F03D 1/00; F03D 7/045; F03D 7/048; F05B 2220/30; F05B 2260/80;
(Continued)

(56) References Cited

U.S. PATENT DOCUMENTS 7,025,567 B2    4/2006 Wobben
2007/0124025 A1*  5/2007 Schram ................. F03D 7/0224
                                                    700/287
(Continued)

FOREIGN PATENT DOCUMENTS

DE       102010063396 A1    6/2012
EP          3009670 B1       1/2018
(Continued)

OTHER PUBLICATIONS

Search Report for German Patent Application No. 10 2017 009 837.9 dated Jul. 10, 2018.

*Primary Examiner* — Yuhui R Pan
(74) *Attorney, Agent, or Firm* — Alix, Yale & Ristas, LLP (57) ABSTRACT

A method for operating a plurality of wind turbines, in which a first current estimated wind value is derived from operating parameters of a first wind turbine, and in which a second current estimated wind value is derived from operating parameters of a second wind turbine. A prediction model is applied to derive, from the first current estimated wind value and the second current estimated wind value, a wind prediction, applicable to a future time point, for a third wind turbine. The wind prediction is processed in a controller, in order to generate a control signal for the third wind turbine that is effective before the future time point. The invention additionally relates to an associated control system. The loading for particular wind turbines can be reduced in that the wind conditions are predicted for a future time point.

11 Claims, 7 Drawing Sheets

(52) U.S. Cl.
CPC ....... *F05B 2220/30* (2013.01); *F05B 2260/80* (2013.01); *F05B 2260/821* (2013.01); *F05B 2260/8211* (2013.01); *F05B 2260/84* (2013.01); *F05B 2270/111* (2013.01); *F05B 2270/20* (2013.01); *F05B 2270/32* (2013.01); *F05B 2270/321* (2013.01); *F05B 2270/404* (2013.01)

(58) Field of Classification Search
CPC ........ F05B 2260/821; F05B 2260/8211; F05B 2260/84; F05B 2270/111; F05B 2270/20; F05B 2270/32; F05B 2270/321; F05B 2270/404; G05B 13/048
See application file for complete search history.

(56) References Cited

U.S. PATENT DOCUMENTS

| | | | |
|---|---|---|---|
| 2012/0200086 A1* | 8/2012 | Kang | F03D 9/257 290/44 |
| 2013/0300115 A1 | 11/2013 | Seem et al. | |
| 2013/0334817 A1 | 12/2013 | Scholte-Wassink | |
| 2014/0037447 A1 | 2/2014 | Attia | |
| 2014/0234103 A1* | 8/2014 | Obrecht | F03D 7/0204 416/9 |
| 2014/0336833 A1 | 11/2014 | Marinopoulos et al. | |
| 2015/0308416 A1* | 10/2015 | Ambekar | F03D 17/00 700/287 |
| 2017/0089325 A1* | 3/2017 | Timbus | F03D 7/0292 |

FOREIGN PATENT DOCUMENTS

| | | |
|---|---|---|
| WO | 2011014712 A2 | 2/2011 |
| WO | 2013025568 A2 | 2/2013 |
| WO | 2013083131 A1 | 6/2013 |

\* cited by examiner

CONTROL SYSTEM AND METHOD FOR OPERATING A PLURALITY OF WIND TURBINES

BACKGROUND

The invention relates to a control system and to a method for operating a plurality of wind turbines.

In wind parks composed of a plurality of wind turbines, there arises the problem that, depending on the wind direction, some wind turbines are located upwind in front of other wind turbines. Downwind of the front wind turbines, inconsistent wind conditions occur, as a result of which the wind turbines located downwind can be subjected to increased loading.

One approach for reducing the loads is to predict changes in the wind conditions for the wind turbines located downwind, such that, even before the changed wind conditions occur, the wind turbines can be brought into a state in which there is lesser loading, WO 03/01 2293 A2, DE 10 2010 063 396 A1, WO 2013/083131.

For a reliable prediction, it is generally not sufficient to have local information about the current wind conditions in the case of a single wind turbine located upwind. Rather, it is desirable to obtain a two-dimensional or three-dimensional record of the current wind conditions, to enable a prediction to be made for future time points, EP 3 009 670 A1. However, it is not entirely easy to obtain precise information about the current wind conditions. The measurement values of an anemometer arranged on a wind turbine are normally falsified by the motion of the rotor, and are therefore not sufficiently reliable. By means of LIDAR sensors it is possible to survey the wind conditions upwind of a wind turbine, and thus in a region that is not disturbed by the rotor. This, however, is demanding of resources and expensive. It is likewise demanding of resources and expensive to equip a wind park with sensors that are separate from the wind turbines.

SUMMARY OF THE INVENTION

The invention is based on the object of presenting a control system and a method for operating a plurality of wind turbines, with which the loading on particular wind turbines can be reduced in an inexpensive and reliable manner. Proceeding from the prior art, the object is achieved with the features of the independent claims. Advantageous embodiments are specified in the dependent claims.

In the case of the method according to the invention, a first current estimated wind value is derived from operating parameters of a first wind turbine. A second current estimated wind value is derived from operating parameters of a second wind turbine. A prediction model is applied to derive, from the first current estimated wind value and the second current estimated wind value, a wind prediction, applicable to a future time point, for a third wind turbine. The wind prediction is processed in a controller, in order to generate a control signal for the third wind turbine that is effective before the future time point. The prediction model can process further information besides the first current estimated wind value and the second current estimated wind value.

The invention has identified that the sought objective can only be achieved by the interaction of a plurality of aspects. The method is based on the fact that, with the estimated wind values for a plurality of wind turbines, there is reliable information available about the current wind conditions. It has been found that the estimated wind values derived from operating parameters of the wind turbine are significantly less susceptible to error than, for example, the measurement values recorded by means of an anemometer arranged on the wind turbine. Since the prediction model is fed with estimated wind values that represent the current wind conditions in the case of a plurality of wind turbines, a broad information base is obtained, such that a reliable wind prediction is obtained from the prediction model. The wind prediction relates to the wind conditions in the case of the third wind turbine at a time point after the current time point (future time point). Between the current time point, at which the estimated wind values are determined, and the future time point there thus remains a time span within which the controller can process the wind prediction in order to preventatively set the third wind turbine to the changed wind conditions that are to be expected a short time later (pre-control).

The control signal for the third wind turbine may be generated in a controller of the third wind turbine. It is also possible to generate the control signal in a controller of another wind turbine, or in a controller of the wind park (park master) to which the third wind turbine belongs.

The increased reliability of the estimated wind value according to the invention, as compared with a direct anemometer measurement, results from the fact that the estimated wind values are derived from the air-mass flow acting upon the entire rotor. In comparison with an anemometer arranged on the wind turbine, a significantly greater measurement area is therefore available. The operating parameters from which an estimated wind value are derived are selected such that there is a dependence between the operating parameters and the wind load acting upon the rotor. Thus, if the wind load acting upon the rotor changes, there is a resultant change in the operating parameters that is dependent thereon. Possible operating parameters of a wind turbine that may be taken into account in the determination of an estimated wind value are, for example, the rotational speed of the rotor, the pitch angle of one or more rotor blades, the torque of the generator, an inclination of the tower and/or the deformation of a rotor blade. Furthermore, an estimated or metrologically determined air density may also be taken into account. In particular, a change in one of these quantities may be included in the determination of an estimated wind value.

An improvement in the reliability of the estimated wind values according to the invention can be achieved in that the wind prediction for the third wind turbine is obtained from the current estimated wind values of a plurality of wind turbines. The more estimated wind values that are included in the wind prediction, the more accurate the wind prediction for the third wind turbine becomes.

The prediction model may be designed such that the wind prediction extends over a geographical area, the third wind turbine being located within the geographical area. A wind prediction for a future time point can then be derived, from the prediction model, for each location within the geographical area. The prediction model may be designed such that the wind prediction has a fixed value at a particular location, irrespective of the height above the ground. Also possible is a three-dimensional configuration of the prediction model, in which the wind prediction changes, not only in dependence on the geographical location, but also in dependence on the height above the ground.

The prediction model may be designed to map the wind prediction into a coordinate system. The coordinate system may be assigned to the geographical area over which the wind prediction extends. The geographical position of the third wind turbine may be defined by coordinates in the coordinate system. On the basis of these coordinates, the controller of the third wind turbine can ascertain the wind prediction applicable to the third wind turbine, and from this derive a control signal for the wind turbine.

The wind prediction preferably comprises at least one prediction value for the wind direction, and a prediction value for the wind strength. The wind prediction may additionally comprise prediction values for horizontal/vertical wind gradients, turbulences and/or the air density. The prediction values determined for a particular geographical position may form a coherent data set. Apart from the geographical position, time information, indicating the future time point to which the wind prediction applies, may be assigned to this data set.

The controller of the third wind turbine may be designed to derive a control signal from the wind prediction, in particular, if the loading of the third wind turbine to be expected according to the wind prediction is greater than the present loading of the third wind turbine. The control signal may be configured such that it effects a reduction in the power drawn from the wind. For example, the control signal may increase the collective pitch angle, i.e. the pitch angle of all rotor blades.

The stronger the control signal, the more significant is the reduction in the loading of the wind turbine. The greater the difference between the present wind speed in the case of the third wind turbine and the wind speed predicted by the wind prediction, the stronger the control signal may be. This applies primarily to the case of the predicted wind speed being greater than the present wind speed. The present wind speed may relate to the time point at which the controller of the third wind turbine generates the control signal.

In addition or as an alternative to this, the greater the difference between the present turbulence intensity in the case of the third wind turbine and the turbulence intensity predicted by the wind prediction, the stronger the control signal may be. The third wind turbine is designed to execute the change prescribed by the control command, i.e. for example to change the collective pitch angle.

If the operating state of a wind turbine is altered such that it is subjected to lesser loadings, the power drawn from the wind is usually also reduced. In order to keep the yield losses low, the method may be configured such that it is active only when the present wind speed is above the nominal wind speed, and/or the third wind turbine is presently being operated at the nominal output. The method may be inactive in the case of a wind speed below the nominal wind speed, and/or in the case of operation of the third wind turbine below the nominal output. The present wind speed may be the present wind speed in the case of the third wind turbine.

For appropriate execution of the method, it is advantageous if the third wind turbine is located downwind from the first wind turbine and the second wind turbine. A line is then obtained, aligned transversely in relation to the wind direction, as viewed from which the first wind turbine and the second wind turbine are located upwind, and the third wind turbine is located downwind. The first wind turbine and the second wind turbine may be located on two sides of a straight line drawn, in the wind direction, from the third wind turbine.

The prediction model may have a function by which a front line of a wind field is determined. A front line denotes a line, aligned at right angles to the wind direction that moves at wind speed in the wind direction. Such a front line is a simple possibility for mapping the propagation of the current values for the wind speed and the wind direction, derived from the first estimated wind value and the second estimated wind value. Taking account of the distance of the third wind turbine from the front line, as viewed upwind, and taking account of the wind speed at which the front line is moving in the wind direction, it is possible to determine a time lag until the wind conditions mapped by the third front line reaches the third wind turbine. Obtained directly from the time lag is the associated future time point for the third wind turbine to which the wind prediction applies.

If the wind speed predicted for the future time point is greater than the present wind speed in the case of the third wind turbine, a control signal for the third wind turbine may be generated shortly before the future time point, and processed such that the third wind turbine is subjected to lesser loading. In particular, the collective pitch angle may be preventatively increased by such a pre-control. The speed at which the front line moves may correspond to the wind speed determined from the first estimated value and the second estimated value, or be derived from this wind speed.

Used with such a front line is a prediction model by which the wind conditions determined from the first estimated wind value and/or the second estimated wind value are projected, in particular projected linearly. In addition or as an alternative to this, in one embodiment of the invention, account is taken of the fact that the first wind turbine and the second wind turbine themselves may also have an effect upon the wind conditions that is relevant for the third wind turbine. In other words, the prediction model is configured such that a wake model is included in the determination of the wind prediction, the wake model representing the wake of the first wind turbine and/or of the second wind turbine.

The term wake denotes a spatial region, located downwind of an operating wind turbine, in which the wind conditions differ from what they would be without the presence of the wind turbine. The prediction model according to the invention may be designed such that, in the determination of the wind prediction, a wake model is used, according to which the wind speed in the wake of a wind turbine is reduced in comparison with undisturbed wind conditions. The assumption of a reduced wind speed may include a spatial region located downwind from the first wind turbine and/or the second wind turbine. The spatial region may be cylindrical, wherein the axis of the cylinder may intersect the rotor hub. The diameter of the cylinder may correspond to the rotor diameter.

In a development of the invention, it may be taken into account in the prediction model that the wake typically does not adjoin the rotor in the form of a cylinder, but spreads out from this cylinder shape as the distance from the rotor increases. The assumption of a reduced wind speed may thus comprise a spatial region that extends downwind from the wind turbine and that widens as the distance from the wind turbine increases. The attendance may be conical. The axis of the conical shape may intersect the rotor hub. The diameter of the cone in the region of the rotor may correspond to the rotor diameter.

In addition or as an alternative to this, the wake model may be configured such that an increased turbulence is assumed in a spatial region located downwind from the first wind turbine and/or the second wind turbine. The spatial region in which the wake model assumes an increased turbulence may correspond to the spatial region in which the wake model assumes a reduced wind speed. If the turbulence predicted for the future time point is greater than the present turbulence in the case of the third wind turbine, a control signal for the third wind turbine may be generated shortly before the future time point, and processed such that the third wind turbine is subjected to lesser loading. For example, the collective pitch angle of all rotor blades may be preventatively increased by such a pre-control.

In a simple variant, the prediction model may be designed such that, upon a change in the wind direction, a linear projection is applied. This means that the front line derived from the first estimated wind value and the second estimated wind value changes its alignment. The speed at which the front line moves downwind is derived directly from the wind speed according to the first estimated wind value and the second estimated wind value. A time lag can be calculated from the distance, as viewed upwind, between the third wind turbine and the front line, and from the speed at which the front line is moving downwind, and it is thereby possible to determine the future time point at which the changed wind direction will reach the third wind turbine.

In a variant of the invention, the prediction model may be realized such that a wake model is applied in respect of changes in the wind direction. Taking account of the wake model, the future time point at which a change in the wind direction will reach the third wind turbine can be calculated as a sum of the linearly determined time lag and a wake-related additional time. It has been found that the wake results in an additional delay, until a change in the wind direction has progressed to a wind turbine located downwind.

The consideration of a wake model in the prediction model has independent inventive content, even without a first estimated wind value being derived from operating parameters of a first wind turbine, a second estimated wind value being derived from operating parameters of a second wind turbine, and the wind prediction being derived from the first estimated wind value and the second estimated wind value. In the case of this aspect of the invention it is thus possible, in particular, for production to be effected on the basis of measured wind values instead of estimated wind values. Moreover, it is possible for the wind prediction to be based on the current wind conditions of only one single wind turbine.

The method may be executed such that a wind prediction, which comprises the entire geographical area of the wind park, is compiled continuously from the available estimated wind values. If the wind predictions are each provided with time stamps, each individual wind turbine can determine the wind prediction applicable to it, for a future time point, on the basis of its geographical coordinates and by selection of the appropriate time stamp. It is possible to dynamically update a wind prediction with a particular time stamp when more recent estimated wind values are available. For this, it is advantageous if stored estimated wind values, recorded at differing time points, can be accessed.

It is also possible for the estimated wind values of the wind turbines concerned to be stored, and for the wind prediction and the stored estimated wind values to be processed, in order to compile a wind prediction for the location of a wind turbine. With this procedure, also, it is possible to use a prediction model that applies to a larger geographical region.

The method may be executed with a greater number of wind turbines, the estimated wind values obtained in the case of a first group of wind turbines being used to compile a wind prediction applying to a future time point for a second group of wind turbines. The method may be executed such that the assignment of wind turbines to the first group and the second group is altered in dependence on the future time point to which the wind prediction is applicable, and/or in dependence on the wind direction.

The greater number of wind turbines may comprise, for example, at least 10 wind turbines, preferably at least 20 wind turbines, more preferably at least 50 wind turbines. The plurality of wind turbines may be combined to form a wind park. The wind park may comprise a central controller, which makes specifications for the operation of individual wind turbines.

It may be advantageous for the method if a sequence of estimated wind values, which have been determined at differing time points, is stored for each participating wind turbine. Each of the estimated wind values may be provided with a time stamp, such that the time point at which the estimated wind value was recorded is verifiable. The time period over which the sequence of estimated wind values extends may be fixed such that it includes the period required by a wind field, in the case of the lowest wind speed to be taken into consideration, to cover the greatest distance between two participating wind turbines. A ring buffer, in which the data can be stored over the required time span, and in which the older data are automatically replaced by newly received data, may be used for storing the data.

The estimated wind value preferably comprises a value for the wind speed and a value for the wind direction. These data may be stored together with the associated time stamp. In addition, information about the current operating status of the wind turbine concerned may be stored together with the time stamp.

The calculation of the wind prediction may be performed on a central computer that is responsible for a plurality of participating wind turbines. It is also possible to perform the calculation of the wind prediction in a decentralized manner, by means of a computer of a wind turbine.

The method may be executed such that a wind prediction for a future time point is produced for each wind turbine that is located downwind of another wind turbine of the wind park. Each individual wind turbine may request, when required, the prediction that is applicable to it for a particular time point. The time lag between the current time point, at which, for example, a wind field reaches the foremost wind turbines of the wind park, and the future time point, for which the wind prediction predicts the arrival of the gust for the rearmost wind turbines of the wind park, may be considerable. The method may be executed such that, between this current time point and this future time point, updating of the respective wind prediction is effected, for example on the basis of the estimated wind values that have been obtained in the interim at wind turbines located in the middle of the wind park.

No wind prediction is possible, by means of the method according to the invention, for the wind turbines that are foremost with regard to the wind direction. Accordingly, within the meaning of the invention, the foremost wind turbines are always first/second wind turbines, at which estimated wind values are determined. Within the meaning of the invention, all wind turbines located downwind from the foremost wind turbines may be third wind turbines, for which a wind prediction is made. Middle wind turbines of the wind park, which are located both upwind and downwind from other wind turbines of the wind park, may assume both the role of a first/second wind turbine and the role of a third wind turbine, within the meaning of the invention, depending on the future time point to which the wind prediction relates.

The invention additionally relates to a control system, having an acquisition means, which is designed to derive a first current estimated wind value from operating parameters of a first wind turbine, and to derive a second current estimated wind value from operating parameters of a second wind turbine, and having a prediction model, which is designed to derive, from the first current estimated wind value and the second current estimated wind value, a wind prediction, applicable to a future time point, for a third wind turbine, the wind prediction being processed in the control system, in order to generate a control signal for the third wind turbine that is effective before the future time point. Acquisition means includes sensors and measurements of the condition and operating parameters of a wind turbine, a system for communicating this data to a computer, and calculations performed on the sensor readings and measured values to determine a current estimated wind value for a wind turbine at a time point. The invention additionally relates to an arrangement of wind turbines that is equipped with such a control system.

In a preferred embodiment, the control system has a plurality of control computing facilities. The wind prediction in this case is preferably performed on a central computing facility for an entire wind park. The respective wind prediction for an individual wind turbine is transmitted by the central computing facility to the control units of a plurality of individual wind turbines. The respective control units of the individual wind turbines then generate the control signals for the individual wind turbines from the transmitted wind prediction.

The control system may be enhanced with further features, which are described in connection with the method according to the invention. The method may be enhanced with further features, which are described in connection with the control system according to the invention.

BRIEF DESCRIPTION OF THE DRAWINGS

The invention is described exemplarily in the following with reference to the appended drawings, on the basis of advantageous embodiments. There are shown.

DETAILED DESCRIPTION

Figure 1:
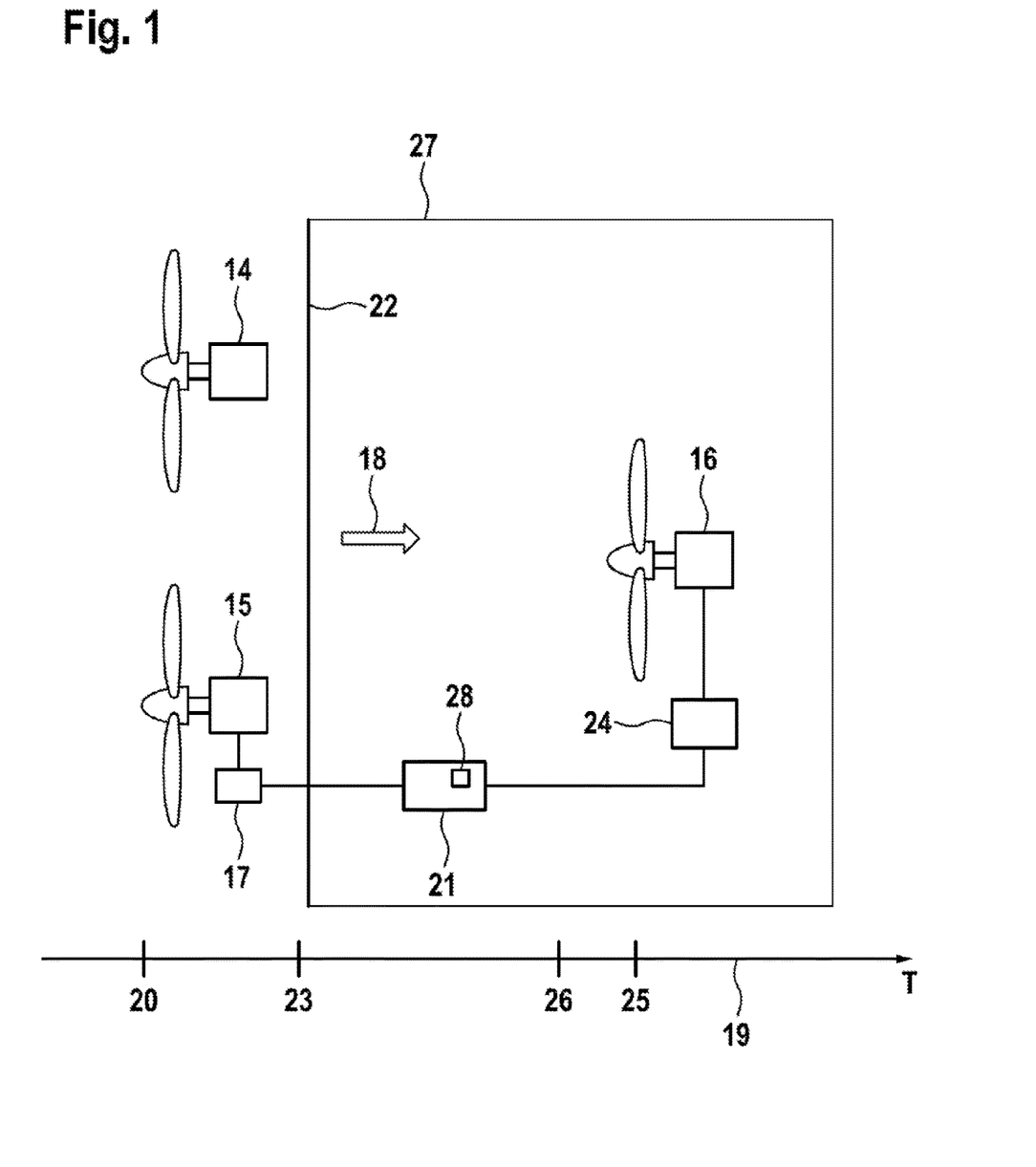
FIG. 1: an arrangement of wind turbines according to the invention.

A wind park shown in FIG. 1 comprises a first wind turbine 14, a second wind turbine 15 and a third wind turbine 16. Each wind turbine 14, 15, 16 comprises a rotor, which is put into rotation by the wind and which drives a generator for the purpose of generating electrical energy. Each wind turbine 14, 15, 16, has a rated electrical energy output, which corresponds to the maximum electrical power the wind turbine can deliver in continuous operation. This maximum electrical power can be referred to as the "nominal output" of the wind turbine 14, 15, 16. The minimum wind speed necessary for the turbine to generate its nominal electrical output can be referred to as the "nominal wind speed" for the turbine 14, 15, 16. Each of the wind turbines 14, 15, 16 additionally comprises a wind estimator 17, which in FIG. 1 is represented only on the example of the wind turbine 15.

The wind estimators 17 are designed to determine, for each of the wind turbines 14, 15, 16, an estimated value for the wind speed and possibly also for the wind direction. Each estimated value is derived from one or more operating parameters of the respective wind turbine 14, 15, 16, which change in dependence on the air-mass flow acting upon the entire rotor. These operating parameters may comprise, for example, the rotational speed of the rotor, the pitch angle of the rotor blades, the torque applied by the rotor and/or a deformation of one or more rotor blades. Since the rotor sweeps a large area, reliable values for the effective wind speed, and optionally also those for the wind direction, can be estimated by means of the wind estimator 17. It is also possible for the wind direction to be measured by means of a wind-direction sensor system known from the prior art.

In the case of the wind direction 18 prevailing in FIG. 1, the third wind turbine 16 is located downwind from the first wind turbine 14 and the second wind turbine 15. The distance between the third wind turbine 16 and the wind turbines 14, 15, as viewed in the wind direction, is such that the third wind turbine 16 is located in the wake of the wind turbines 14, 15. Thus, in the case of the wind direction 18, the wind conditions experienced by the third wind turbine 16 are influenced by the operation of the front wind turbines 14, 15.

Estimated wind values at the first wind turbine 14 and at the second wind turbine 15 are determined, at the current time point 20, on the time axis 19 in FIG. 1. The estimated wind values are passed to a prediction computer 21, in which there is a stored prediction model 28. The estimated wind values are fed into the prediction model 28, which processes the estimated wind values in order to determine a wind prediction relating to a future time point.

The wind prediction comprises a front line 22 of a wind field. At the time point 23, at which the calculation of the wind prediction is completed, the front line 22 is already located somewhat behind the wind turbines 14, 15. According to the prediction model 28, the front line 22 is aligned transversely in relation to the wind direction 18, and is moving in the direction of the third wind turbine 16, at the wind speed derived from the estimated wind values.

From the time point 23 onwards, a control unit 24 of the third wind turbine 16 can request, from the prediction computer 21, a wind prediction for the location of the third wind turbine 16 that is applicable to a future time point 25. Once the time point 25 has come closer, the control unit 24 of the third wind turbine 16 can compare the wind prediction applicable to the time point 25 with the present estimated wind value of the third wind turbine 16. If the wind strength according to the wind prediction is significantly greater than the present estimated wind value, the control unit 24 can generate a control signal, such that the collective pitch angle of the third wind turbine 16 is increased at a time point 26, which is shortly before the time point 25. Thus, by way of a pre-control, the third wind turbine 16 is preventatively brought into a state in which it is subjected to only little loading by the wind gust impinging briefly thereon.

The wind prediction determined by means of the prediction computer 21 extends over a geographical region 27 within which the third wind turbine 16 is located. A wind prediction can be requested, from the prediction computer 21, for each location within the geographical region 27, for a particular time point. For example, the third wind turbine 16 sends a request, together with its geographical coordinates, to the prediction computer 21, and as a response obtains a wind prediction for the future time point 25.

The wind prediction comprises a prediction value for the wind direction and a prediction value for the wind speed. The greater the predicted wind speed in comparison with the present wind speed, the greater is the magnitude by which the pitch angle can be increased by way of pre-control. The wind prediction may additionally comprise a prediction value for the turbulence intensity. The greater the predicted turbulence intensity in comparison with the present turbulence value, the greater is the magnitude by which the pitch angle can be preventatively increased.

Figure 2:
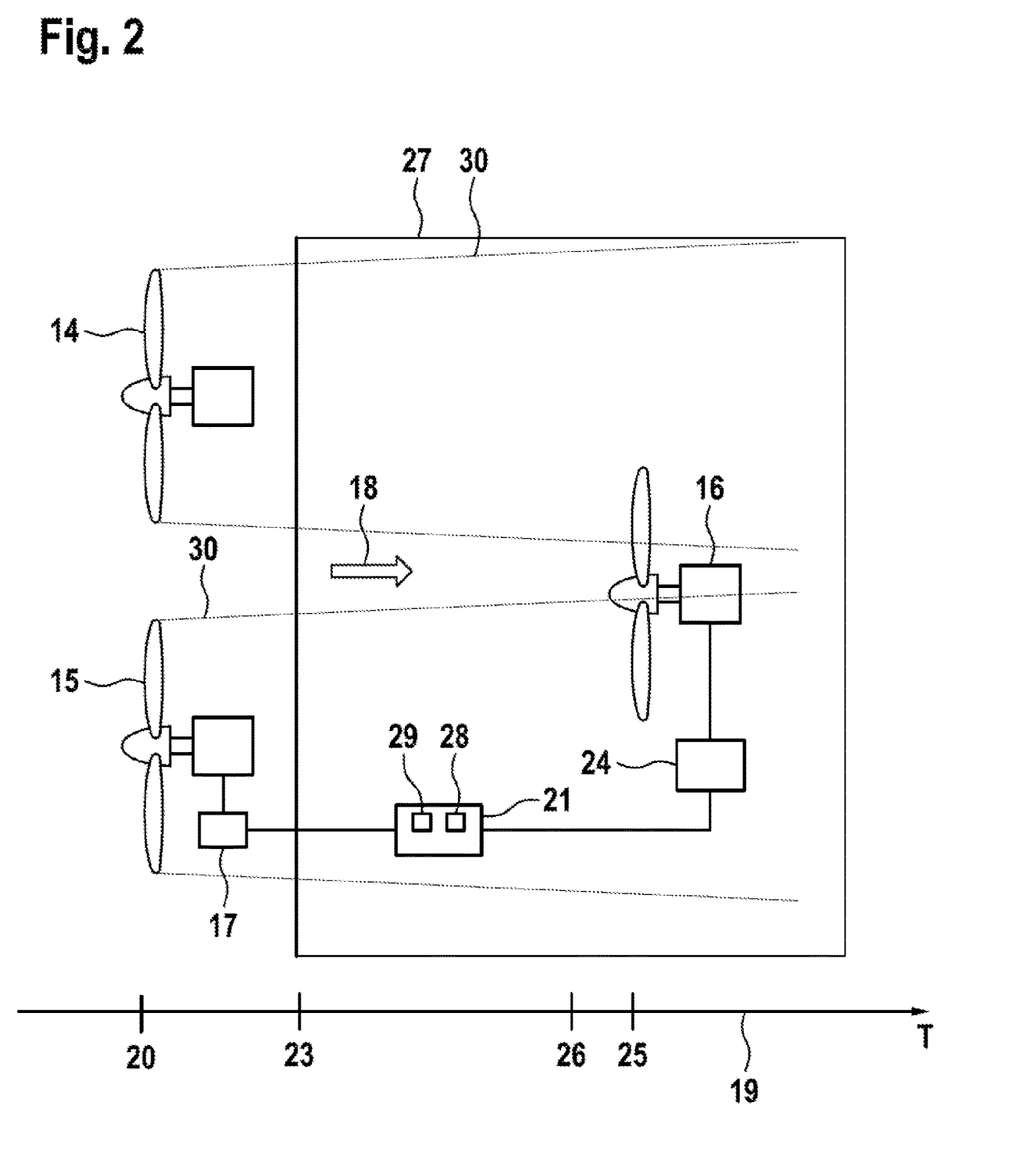
FIG. 2: the view according to FIG. 1, in the case of a different embodiment of the invention.

In the case of the exemplary embodiment according to FIG. 2, the prediction model 28 comprises a wake model 29. The wake model 29 makes it possible to take account of the fact that, in the wake 30 of the wind turbines 14, 15, the wind speed is reduced in comparison with an undisturbed wind field. As mapped in the wake model, the wake 30 begins in the plane of the rotors of the wind turbines 14, 15, and propagates in the wind direction, the wake increasing in cross section as the distance from the rotors increases.

Figure 3:
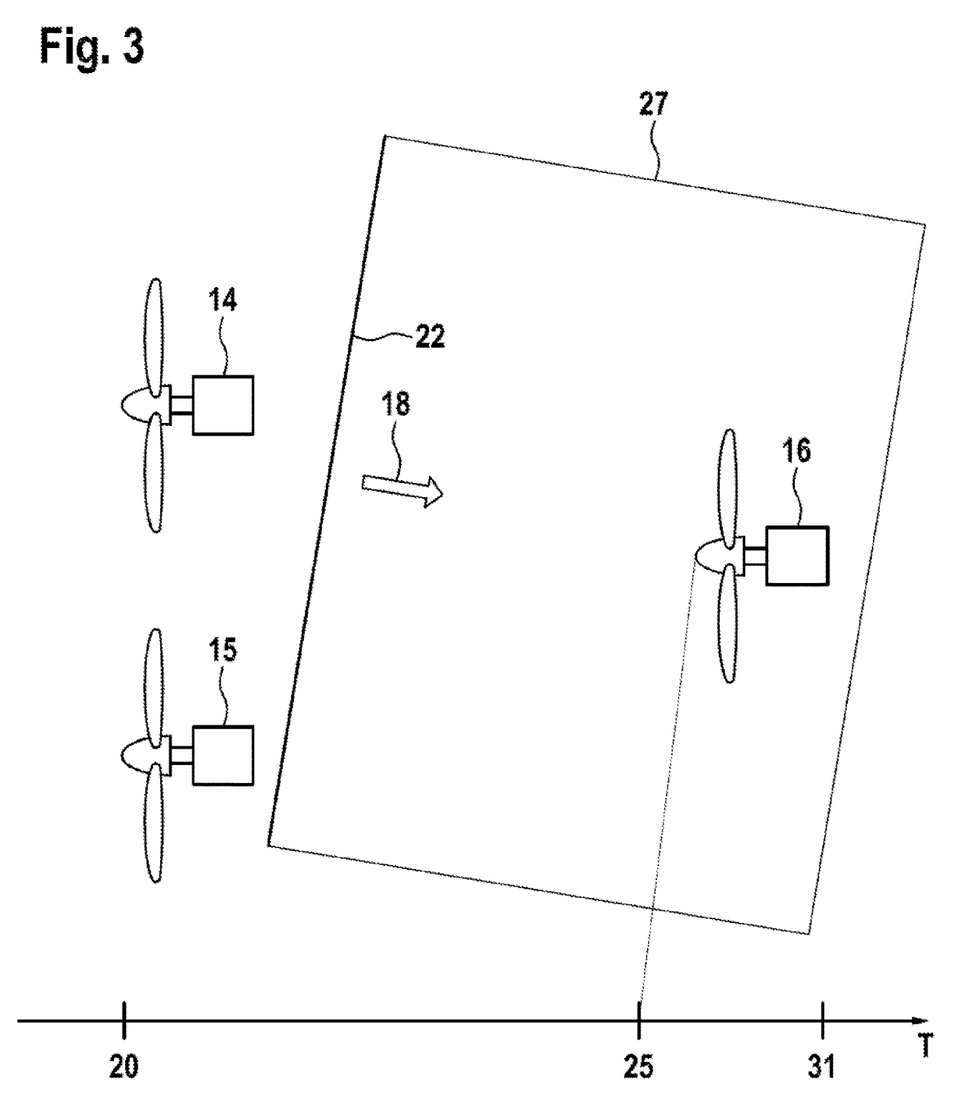
FIG. 3: the view according to FIG. 1, in the case of a further embodiment of the invention.

Shown in FIG. 3 is a variant of a wind park according to the invention, in which the prediction model 28 likewise comprises a wake model 29. At the time point 20 the estimated wind values determined by the wind turbines 14, 15 indicate a change in the wind direction. As the foremost wind turbines in the wind direction, the wind turbines 14, 15 were unable to react preventatively to the change in wind direction, and are still facing toward the previous wind direction.

Obtained by means of the prediction model 28 is a front line 22, which is aligned at right angles in relation to the new wind direction 18. With linear projection of the front line 22, according to the wind speed, the new wind field would reach the third wind turbine 16 at the future time point 25. With the wake model 29, it is taken into consideration that, owing to the wake, there is a resultant time lag until the changed wind direction reaches the third wind turbine 16. According to the prediction model 28, the changed wind direction will reach the wind turbine 16 only at the later time point 31. The time span between the future time point 25 and the future time point 31 is referred to as the wake-related additional time.

Figure 4:
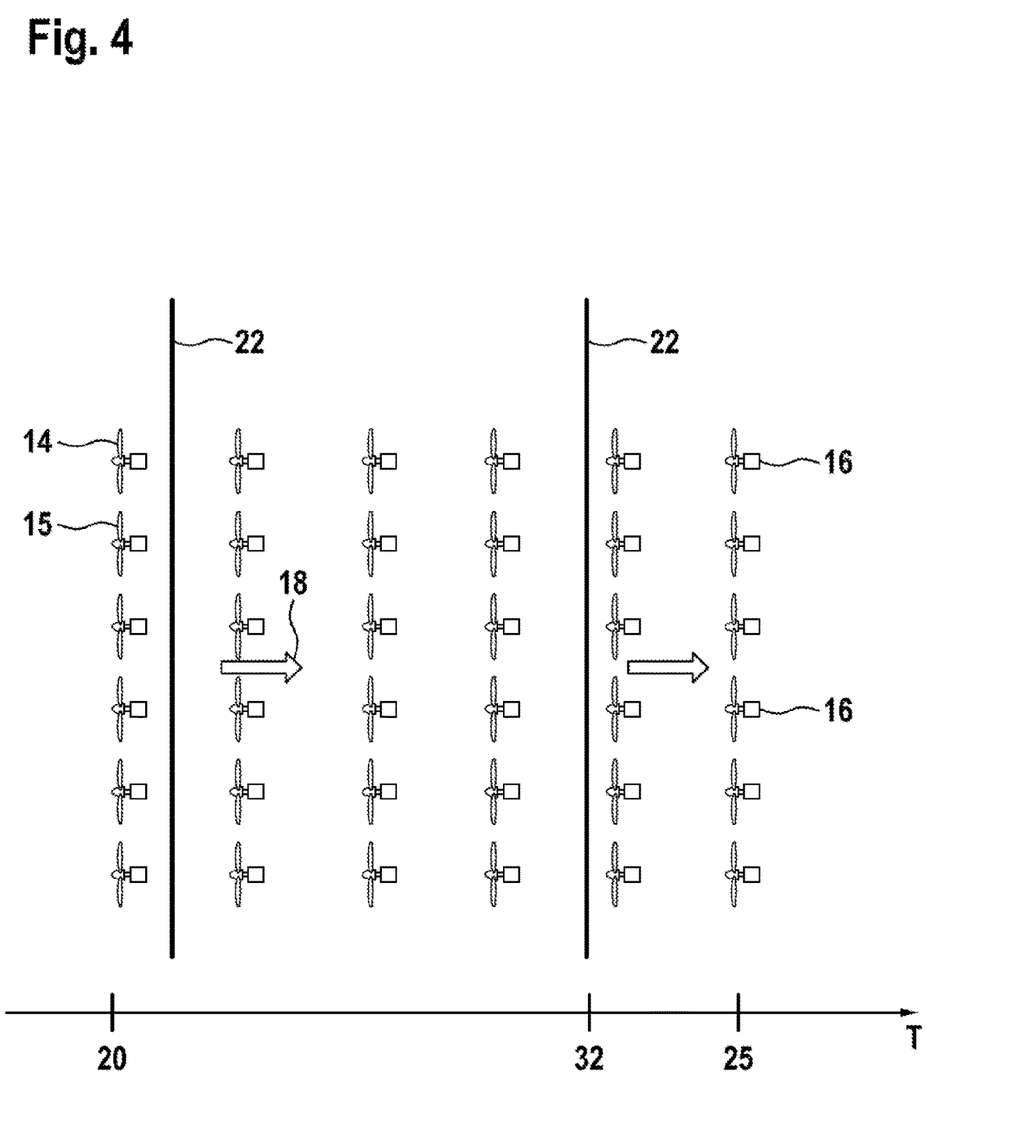
FIG. 4: an alternative embodiment of the invention.

In the case of the embodiment according to FIG. 4, the wind park comprises a greater number of wind turbines. The wind turbines of the wind park that are foremost in the wind direction are first and second wind turbines 14, 15 within the meaning of the invention. If, at a current time point 20, estimated wind values are obtained in the case of the foremost wind turbines 14, 15, a wind prediction is obtained therefrom for the rearmost (third) wind turbines 16 of the wind park, which is applicable to the future time point 25.

A wind prediction that is based on the estimated wind values obtained at the time point 20 may include all wind turbines located between the foremost wind turbines 14, 15 and the rearmost wind turbines 16. In addition, at an intermediate time point 32, use can already be made of estimated wind values from the other wind turbines over which the wind field has swept in the interim. The wind prediction that is dynamically updated at the time point 32 for the time point 25 for the rearmost wind turbines 16 is based on a broader database, resulting in a greater reliability of the wind prediction.

Figure 5:
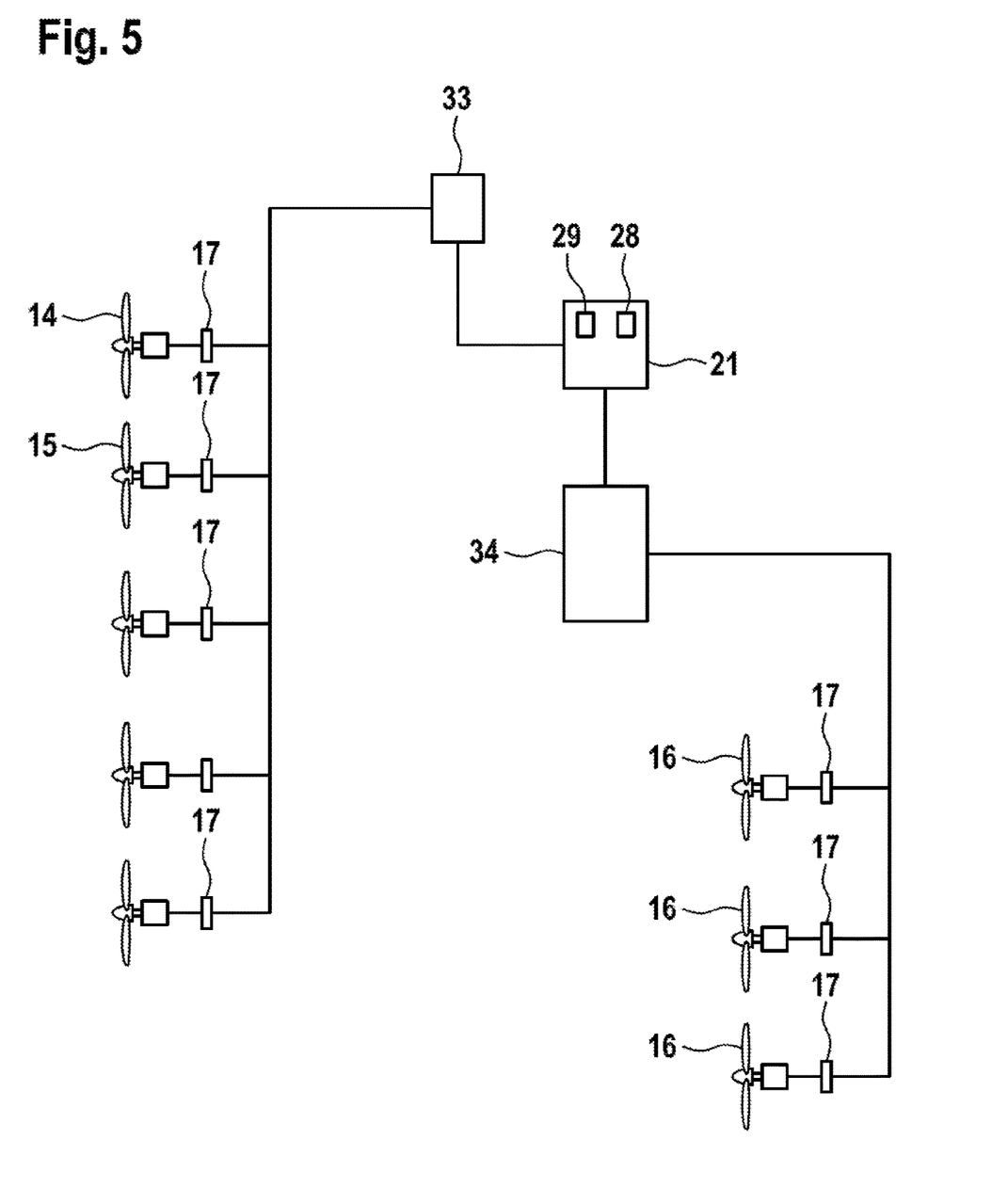
FIG. 5: a schematic representation of a control system according to the invention.

In the case of the wind park represented schematically in FIG. 5, the front wind turbines 14, 15, the estimated wind values of which are used to compile the wind prediction, are represented separately from the rear wind turbines 16, to which the wind prediction applies. Which of the wind turbines of the wind park belong to which of the two groups changes depending on the wind direction, and depending on the wind turbines to which the wind prediction is to apply. All wind turbines 14, 15, 16 are equipped with wind estimators 17, which send estimated wind values to a central buffer 33. In the central buffer 33, the estimated wind values are stored together with the geographical coordinates of the respective wind turbine and with an associated time stamp. In addition to this, in each case information may be stored about the operating state of the wind turbine concerned at the respective time point.

The data are stored in the buffer 33 for as long as is required by the slowest wind field to be considered to move over the greatest extent of the wind park. The slowest wind field to be considered may have a speed, for example, corresponding to the cut-in wind speed of the wind turbines. The buffer 33 is realized as a ring buffer, such that the oldest data of this period are in each case replaced by newer data.

A central prediction computer 21 accesses the estimated wind values stored in the buffer 33 for the purpose of continuously developing wind predictions, which apply to the wind park at differing time points. The wind predictions are stored in a second buffer 34. Each of the wind turbines 16 can access the second buffer 34 and request the wind prediction that is applicable to their geographical coordinates and to a particular future time point.

Figure 6:
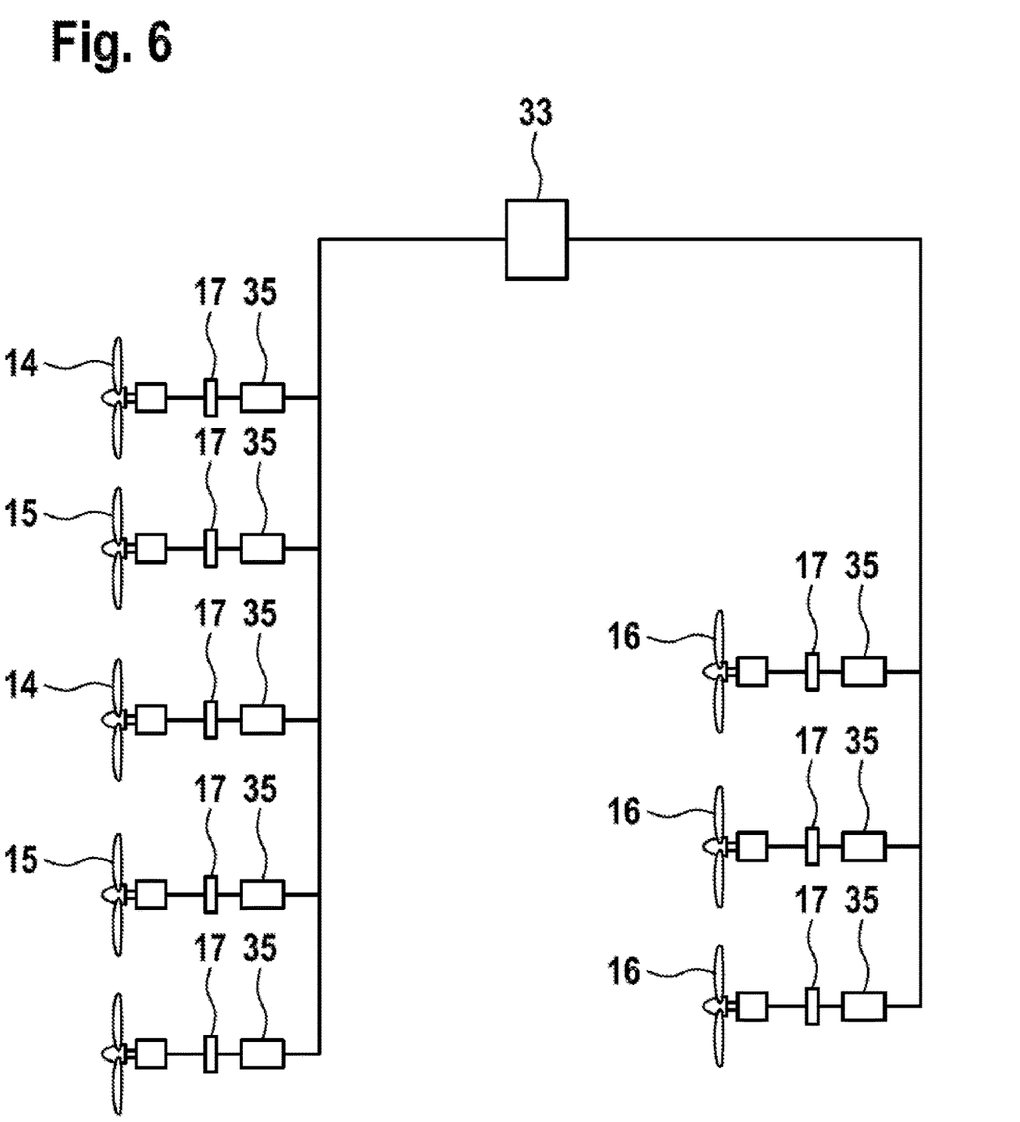
FIG. 6: a schematic representation of an alternative embodiment of a control system according to the invention.

FIG. 6 shows an embodiment in which the estimated wind values of all wind turbines 14, 15, 16 are stored in a central buffer 33. Each wind turbine 14, 15, 16 is equipped with a decentralized prediction computer 35, which accesses the estimated wind value in the buffer 33 in order to compile a wind prediction, for a future time point, that is applicable only to the respective wind turbine. The calculation may be effected on the basis of a prediction model 28 that is applicable to a larger geographical region.

The decentralized prediction computer 35 may be set up such that it selectively accesses only those estimated wind values in the buffer 33 that are relevant to the respective wind turbine. These are those wind turbines that are located upwind of the respective wind turbine, and in particular those wind turbines whose wake affects the respective wind turbine.

Figure 7:
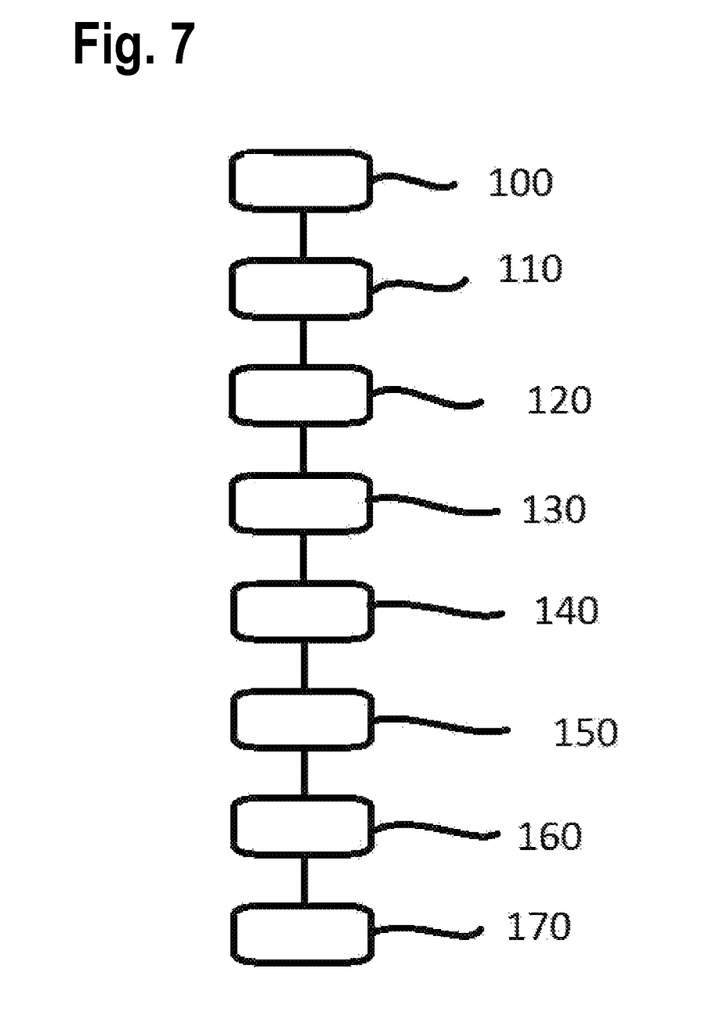
FIG. 7: a flow chart showing an example of steps in obtaining a wind prediction according to aspects of the invention.

With reference to FIG. 7 the method step of obtaining a wind prediction applicable to a future time point for a third wind turbine 16 is explained in further detail. The method starts in step 100. In step 110 a value for the wind speed and a value of the wind direction at the first wind turbine 14 are obtained. The value for the wind speed and the wind direction are not obtained by a reading of a measuring instrument (like e.g. anemometer or wind vane), but are estimated based on operating parameters of the first wind turbine 14. It is well known in the art that the wind speed and the wind direction can be estimated from operating parameters of a wind turbine like e.g. rotational speed of the rotor, the pitch angle of one or more rotor blades, the torque of the generator, an inclination of the tower and/or the deformation of a rotor blade.

In step 120 a value for the wind speed and a value for the wind direction at the second wind turbine 15 are obtained by estimation from operating parameters of the second wind turbine 15.

With reference to FIG. 1 a wind field approaches the first wind turbine 14 and the second wind turbine 15 at a time point 20. The wind field may be assumed to have a different wind speed than the previous wind at the wind turbines 14, 15. This means at time point 20 the wind turbines 14, 15 face a change in wind speed.

In step 130 a direction of a frontline 22 of the wind field is determined. In the exemplary embodiment of FIG. 1 the wind field hits both wind turbines 14, 15 at the same point in time. The frontline 22 in this case is determined to be parallel to the rotor planes of the wind turbines 14, 15. In the exemplary embodiment of FIG. 3 the frontline 22 hits wind turbines 14, 15 in different points in time. In this case the direction of the frontline 22 can easily be determined based on the time difference and the wind speed.

In step 140 a velocity of the frontline 22 is determined by identifying the velocity of the frontline 22 with the wind speed. In case the wind speed at the first wind turbine 14 is different than the wind speed at the second wind turbine 15 the velocity of the frontline 22 can be determined as the average between the two wind speeds.

In step 150 a future time point 25 is determined for arrival of the frontline 22 at the third wind turbine 16. The future time point 25 is determined based on the distance between the frontline 22 and the third wind turbine 16 and based on the velocity of the frontline 22.

In step 160 a prediction is made that at future time point 25 the third wind turbine 16 will face a wind condition corresponding to the velocity and the direction of the frontline 22. Steps 130, 140, 150, 160 are an exemplary mode of applying a prediction model to wind values of the first and second wind turbines 14, 15 to derive a wind prediction for a third wind turbine that is applicable to a future time point 25. Other variants of prediction models are described in this specification.

The invention claimed is:

1. A method for operating a plurality of wind turbines, said method comprising:
   deriving a first current estimated wind value from operating parameters of a first wind turbine;
   deriving a second current estimated wind value from operating parameters of a second wind turbine;
   applying a prediction model to said first current estimated wind value and said second current estimated wind value to derive a wind prediction applicable to a future time point for a third wind turbine; and
   processing said wind prediction in a controller to generate a control signal for the third wind turbine that is effective before the future time point,
   wherein, in the case of a change in a wind direction, said method comprising:
   determining in the prediction model a time span between a current time point and the future time point as a sum of a time lag derived from a current wind speed and an additional time that represents a wake of the first wind turbine or a wake of the second wind turbine.

2. The method of claim 1, comprising:
   mapping the wind prediction into a geographical coordinate system by said prediction model.

3. The method of claim 2, comprising:
   defining a location of said third wind turbine by coordinates within the geographical coordinate system.

4. The method of claim 1, wherein said third wind turbine draws power from the wind, said method comprising:
   reducing the power drawn from the wind by the third wind turbine according to the control signal.

5. The method of claim 1, wherein said method is active only when the current wind speed is above a nominal wind speed or the third wind turbine is being operated at a nominal output.

6. The method of claim 1, comprising:
   deriving, in the prediction model, a speed at which a front line of a wind field is approaching the third wind turbine from the first estimated wind value or from the second estimated wind value.

7. The method of claim 1, comprising:
   including a wake model in the prediction model, said wake model according to which the wake widens as a distance from the first or second wind turbine increases.

8. The method of claim 1, comprising:
   determining a sequence of estimated wind values at differing time points for each wind turbine, and
   storing the sequence of estimated wind values for each wind turbine.

9. The method of claim 8, comprising:
   using the estimated wind values determined for a first group of wind turbines to compile a wind prediction, applicable to a future time point, for a second group of wind turbines.

10. The method of claim 9, comprising:
    assigning a wind turbine to the first group or the second group depending upon a wind direction or depending upon the future time point to which the wind prediction is applicable.

11. A control system for a plurality of wind turbines, said control system comprising:
    acquisition means which derives a first current estimated wind value from operating parameters of a first wind turbine and derives a second current estimated wind value from operating parameters of a second wind turbine; and
    a prediction model which derives a wind prediction, applicable to third wind turbine at a future time point, from the first current estimated wind value and the second current estimated wind value; and
    a control system which processes said wind prediction and generates a control signal for the third wind turbine that is effective before the future time point,
    wherein, in the case of a change in a wind direction, said control system determines in the prediction model a time span between a current time point and the future time point as a sum of a time laq derived from a current wind speed and an additional time that represents a wake of the first wind turbine or a wake of the second wind turbine.

* * * * *